(12) United States Patent (10) Patent No.: US 9,175,934 B1
Kilian (45) Date of Patent: Nov. 3, 2015

(54) AUTO-INJECTOR COUNTERMEASURE FOR UNMANNED AERIAL VEHICLES

(71) Applicant: Lockheed Martin Corporation, Bethesda, MD (US)

(72) Inventor: James C Kilian, Tyngsborough, MA (US)

(73) Assignee: Lockheed Martin Corporation, Bethesda, MD (US)

( * ) Notice: Subject to any disclaimer, the term of this patent is extended or adjusted under 35 U.S.C. 154(b) by 432 days.

(21) Appl. No.: 13/680,597

(22) Filed: Nov. 19, 2012

(51) Int. Cl.
*F41G 9/00* (2006.01)
*F41H 13/00* (2006.01)
*G05D 1/12* (2006.01)
*B64D 47/08* (2006.01)

(52) U.S. Cl.
CPC ............... *F41H 13/00* (2013.01); *B64D 47/08* (2013.01); *G05D 1/12* (2013.01)

(58) Field of Classification Search
CPC .......... F41B 6/006; F41B 6/00; F42B 12/625; F42B 12/58; F42B 12/06; F42B 27/00; F42B 12/02; F42B 12/62
See application file for complete search history.

(56) References Cited

U.S. PATENT DOCUMENTS

| | | | |
|---|---|---|---|
| 3,102,417 A * | 9/1963 | Chambers | 73/81 |
| 4,174,837 A | 11/1979 | Benke | |
| 4,664,344 A * | 5/1987 | Harwell et al. | 244/172.4 |
| 4,893,815 A * | 1/1990 | Rowan | 463/47.3 |
| 5,085,641 A | 2/1992 | Sarnoff et al. | |
| 5,202,533 A | 4/1993 | Vandersteen | |
| 5,345,238 A * | 9/1994 | Eldridge et al. | 342/3 |
| 5,521,817 A * | 5/1996 | Burdoin et al. | 701/3 |
| 5,567,160 A | 10/1996 | Massino | |
| 5,728,968 A * | 3/1998 | Buzzett et al. | 102/364 |
| 5,868,699 A | 2/1999 | Woodruff et al. | |
| 6,099,503 A | 8/2000 | Stradella | |
| 6,109,185 A * | 8/2000 | Mikhail | 102/476 |
| 6,491,256 B1 * | 12/2002 | Wingo | 244/159.4 |
| 6,584,910 B1 | 7/2003 | Plass | |
| 6,802,237 B1 * | 10/2004 | Jones et al. | 89/1.13 |
| 6,957,602 B1 | 10/2005 | Koenig et al. | |

(Continued)

OTHER PUBLICATIONS

P. Beasley, P. Gray, K. Usher, and N. Bergmann. "Design, Construction and Modelling of a Low Cost Miniature UAV Using Machine Vision"; In Proceedings of the 2007 Australiasian Conference on Robotics and Automation, pp. 1-6. Australian Robotics and Automation Association, 2007.

(Continued)

*Primary Examiner* — John R Olszewski
*Assistant Examiner* — Jean-Paul Cass
(74) *Attorney, Agent, or Firm* — Howard IP Law Group, PC

(57) ABSTRACT

An injector device configured to mount to a predatory unmanned aerial vehicle (UAV) for non-destructively disabling and controlling a threat UAV comprises a rigid housing having a hollow interior. A controllable mount structure attaches the rigid housing to the predatory UAV and aligns the housing opening with the fuselage or payload of the threat UAV. A rigid penetrator rod disposed in the interior of the housing is configured to pierce the fuselage and hence payload of the threat UAV. A conduit coupled to the penetrator rod enables a disabling substance to be conveyed through the penetrator rod and into the payload of the threat UAV. An ejector propels the penetrator rod from the housing and into the payload of the threat UAV in response to a trigger when the threat UAV is within a predetermined range.

22 Claims, 4 Drawing Sheets

(56) References Cited

U.S. PATENT DOCUMENTS

| | | | | |
|---|---|---|---|---|
| 7,143,976 | B2* | 12/2006 | Snediker et al. | 244/110 G |
| 7,150,325 | B2* | 12/2006 | Ireland et al. | 166/366 |
| 7,152,532 | B2* | 12/2006 | Conrad | 102/473 |
| 7,219,856 | B2* | 5/2007 | Watts et al. | 244/110 F |
| 7,335,067 | B2* | 2/2008 | Lee et al. | 439/700 |
| 7,380,503 | B2* | 6/2008 | Williams et al. | 102/518 |
| 7,410,125 | B2 | 8/2008 | Steele | |
| 7,437,996 | B2* | 10/2008 | Turner et al. | 102/489 |
| 7,510,145 | B2* | 3/2009 | Snediker | 244/110 F |
| 7,699,261 | B2 | 4/2010 | Colten et al. | |
| 7,752,976 | B2* | 7/2010 | Banks | 102/489 |
| 7,886,668 | B2* | 2/2011 | Hugus et al. | 102/517 |
| 8,042,470 | B2* | 10/2011 | Dietrich et al. | 102/215 |
| 8,119,956 | B2* | 2/2012 | Janik et al. | 244/3.12 |
| 8,541,724 | B2* | 9/2013 | Roemerman | 244/3.16 |
| 8,661,980 | B1* | 3/2014 | Roemerman et al. | 102/489 |
| 8,661,981 | B2* | 3/2014 | Tepera et al. | 102/495 |
| 8,757,039 | B2* | 6/2014 | Martinez et al. | 89/1.34 |
| 2002/0040949 | A1* | 4/2002 | Brei et al. | 244/158 R |
| 2002/0041328 | A1* | 4/2002 | LeCompte et al. | 348/144 |
| 2002/0084385 | A1* | 7/2002 | Boz et al. | 244/158 R |
| 2004/0118312 | A1* | 6/2004 | Fortner et al. | 102/488 |
| 2005/0016735 | A1* | 1/2005 | Ireland et al. | 166/352 |
| 2006/0081149 | A1* | 4/2006 | Salizzoni et al. | 102/477 |
| 2006/0097102 | A1* | 5/2006 | Chang | 244/3.19 |
| 2006/0175464 | A1* | 8/2006 | Chang | 244/3.19 |
| 2006/0175466 | A1* | 8/2006 | Snediker et al. | 244/110 G |
| 2006/0260501 | A1* | 11/2006 | Conrad | 102/477 |
| 2007/0034073 | A1* | 2/2007 | Banks | 89/1.815 |
| 2008/0262427 | A1 | 10/2008 | Hommann | |
| 2009/0294584 | A1* | 12/2009 | Lovell et al. | 244/110 F |
| 2010/0038490 | A1* | 2/2010 | Hofschuster et al. | 244/158.1 |
| 2010/0275806 | A1* | 11/2010 | Gavin et al. | 102/502 |
| 2012/0032025 | A1* | 2/2012 | Allen et al. | 244/110 C |
| 2012/0192508 | A1* | 8/2012 | Burdine et al. | 52/155 |
| 2012/0200968 | A1* | 8/2012 | Altemose et al. | 361/86 |
| 2012/0272854 | A1* | 11/2012 | Thuman et al. | 102/363 |
| 2013/0099926 | A1* | 4/2013 | Peterson | 340/542 |
| 2013/0103193 | A1* | 4/2013 | Roberts et al. | 700/245 |
| 2013/0124079 | A1* | 5/2013 | Olivier et al. | 701/301 |
| 2013/0206028 | A1* | 8/2013 | Burdine et al. | 102/424 |
| 2013/0341462 | A1* | 12/2013 | Jacobs | 244/110 R |
| 2014/0330544 | A1* | 11/2014 | Nikolaev et al. | 703/2 |

OTHER PUBLICATIONS

A. Bolonkin, "AB-Net Method of Protection From Projectiles (city, military base, battle-front, etc.)"; Article Armor of Large Objects, ArXiv e-prints, Jan. 26, 2008.

R.S. Brinkworth, E.-L. Mah, J.P. Gray, and D.C. O'Carroll. "Photoreceptor Processing Improves Salience Facilitating Small Target Detection in Cluttered Scenes"; Journal of Vision, 8:1-17, 2008.

] T. Coffey and J.A. Montgomery. "The Emergence of Mini-UAV for Military Applications"; Defense Horizons, 22:1-8, 2002.

C.R. Cosnowski. "Defeating 802.11 Wireless Networks"; Master's Thesis, Air Force Institute of Technology, 2008.

DARPA. SB082-002: Autonomous Detection, Acquisition, Pointing and Tracking of Small UAVS. http://www.dodsbir.net/Sitis/archivesdisplaytopic.asp?Bookmark=32278.

S.J. Davey, M.G. Rutten, and B. Cheung. "A Comparison of Detection Performance for Several Track-Before-Detect Algorithms"; EURASIP Journal on Advances in Signal Processing, pp. 1-10, 2008.

Maj. D.J. Davis. "Heavy & Agile: Nine Steps to a More Effective Force"; Armed Forces Journal, Jan. 2008. http://www.armedforcesjournal.com/2008/01/3208280.

DoD. DARPA Budget Estimate 2008/2009. http://www.dtic.mil/descriptivesum/Y2009/DARPA/0602702E.pdf.

J.M. Eklund, J. Sprinkle, H.J. Kim, and S. Sastry. "Implementing and Testing a Nonlinear Model Predictive Tracking Controller for Aerial Pursuit/Evasion Games on a Fixed Wing Aircraft"; In Proceedings of the 24th American Control Conference (ACC 2005, pp. 1509-1514, 2005.

P. La Franchi. "Counter-UAV Operations Pose Challenges for Military Planners"; Flight International, Jul. 2, 2007.

B.P. Gerkey, S. Thrun, and G. Gordon. "Visibility-Base Pursuit-Evasion With Limited Field of View"; In Proceedings of the National Conference on Artificial Intelligence, pp. 20-27. AAAI, 2004.

D.M. Gormley. "UAVs and Cruise Missiles as Possible Terrorist Weapons"; In J.C. Motz, editor, New Challenges in Missile Proliferation, Missile Defense and Space Security, chapter 2. Center for Nonproliferation Studies, University of Southamption, 2003.

D. Hall, J. Nascimento, J. Ribeiro, E. Andrade, P. Moreno, S. Pesnel, T. List, R. Emonet, and R.B. Fisher. "Comparison of Target Detection Algorithms Using Adaptive Background Models"; In 2nd Joint IEEE International Workshop on Visual Surveillance and Performance Evaluation of Tracking and Surveillance, pp. 113-120, 2005.

D. Hambling. "Air Force Completes Killer Micro-Drone Project"; Wired Danger Room, Jan. 5, 2010. http://www.wired.com/dangerroom/2010/01/killer-micro-drone/.

J.P. Hespanha, H.J. Kim, and S. Sastry. "Multiple-Agent Probabilistic Pursuit-Evasion Games"; In Proceedings of the 38th Conference on Decision and Control, pp. 2432-2437, 1999.

N. Hodge. "Air Force Zaps Drones in Laser Test"; Wired Danger Room, Nov. 18, 2009. http://www.wired.com/dangerroom/2009/11/air-force-zaps-drones-in-laser-test/.

T.E. Humphreys, B.M. Ledvina, M.L. Psiaki, and P.M. Kintner Jr. "Assessing the Spoofing Threat: Development of a Portable GPS Civilian Spoofer"; In ION GNSS 2008, the 21st International Technical Meeting of the Satellite Division of the Institute of Navigation, pp. 2314-2325, 2008.

B.A. Jackson, D.R. Frelinger, M.J. Lostumbo, and R.W. Button. "Evaluating Novel Threats to the Homeland: Unmanned Aerial Vehicles and Cruise Missiles"; Technical report, Rand Corporation, 2008.

J. Mandelbaum, J. Ralston, I. Gutmanis, A. Hull, and C. Martin. "Terrorist Use of Improvised or Commercially Available Precision-Guided UAVs at Stand-Off Ranges: An Approach for Formulating Mitigation Considerations"; Technical Report IDA Document D-3199, Institute for Defense Analysis (IDA), Oct. 2005. http://www.dtic.mil/cgibin/GetTRDoc?AD=ADA460419&Location=U2&doc=GetTRDoc.pdf.

E. Miasnikov. "Threat of Terrorism Using Unmanned Aerial Vehicles: Technical Aspects. Technical Report"; Moscow Institute of Physics and Technology Center for Arms Control Energy and Environmental Studies report, Jun. 2004. Translated into English—Mar. 2005. http://www.armscontrol.ru/UAV/UAV-report.pdf.

Office of the Secretary of Defense. Department of defense fiscal year (fy) 2010 budget estimates, May 2009. http://comptroller.defense.gov/defbudget/fy2010/budgetjustification/pdfs/03 RDT and E/ vol. 3 OSD/OSD PB10 RDTE-BA 1-3.pdf.

J.T. Page II, Capt. USAF. "Stealing Zeus's Thunder"; Air & Space Power Journal, Summer 2006. http://www.airpower.maxwell.af.mil/airchronicles/apj/apj06/sum06/page.html.

M. Sirak "ATK Unveils Counter-UAV Systems as Part of Growing Portfolio"; Defense Daily, Aug. 21, 2007. http://www.findarticles.com/p/articles/mi 6712/i/s 36 235/ai n29374560/.

R. H. Williams(ed.). "Unmanned Aircraft Killer Proposed"; National Defense, Aug. 2004. http://www.nationaldefensemagazine.org/ARCHIVE/2004/AUGUST/Pages/Unmanned3480.aspx.

Jieddo. Fy 2008 annual report. Technical report, Joint Improvised Explosive Device Defeat Organization, Apr. 2009.

K. Massey, M. Heiges, and B. DiFranco. "A System-Of-Systems Design of a Guided Projectile Mortar Defense System"; In 24th Applied Aerodynamics Conference. AIAA, 2006.

\* cited by examiner

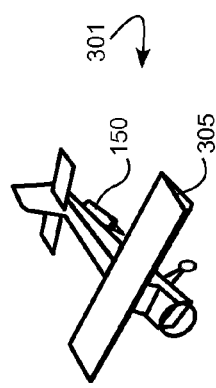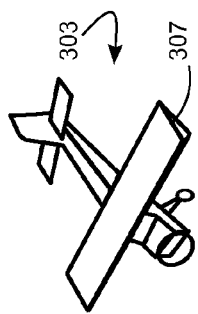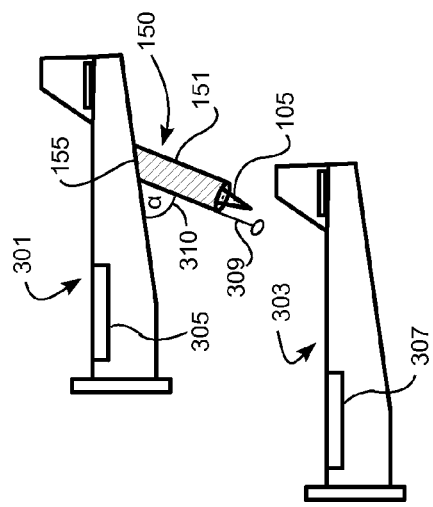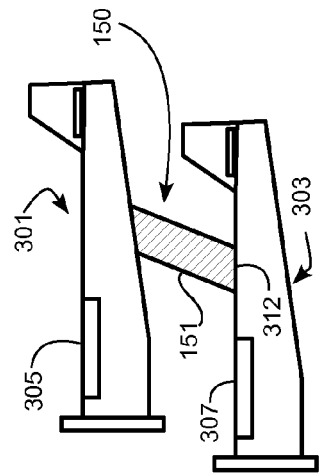
FIG. 3A
FIG. 3B
FIG. 3C

AUTO-INJECTOR COUNTERMEASURE FOR UNMANNED AERIAL VEHICLES

FIELD OF THE INVENTION

The disclosure relates to counter unmanned aerial vehicle (UAV) counter-measures. In particular, the disclosure relates to a counter-UAV device having an auto-injector for non-destructive disabling and control of UAVs.

BACKGROUND OF THE INVENTION

A recent area of concern is the increasing use of unmanned aerial vehicles (UAVs) by hostile adversaries. UAVs small enough to be portable (i.e. human-portable) are often termed miniature (mini) or micro unmanned air vehicles (mUAV, collectively). Such UAVs can be assembled from commercially off-the-shelf materials. A typical mUAV has a wingspan of less than or equal to about three meters, operates at altitudes of less than or equal to about five hundred feet (500 ft.), and can carry a payload of about 1 kilogram (kg) or less to about 30 kg. Electric motors may provide UAVs with acoustic stealth. Commercially available miniature flight control computers and sensors provide mUAVs with some degree of autonomy, mitigating the need for line of sight operation.

It is anticipated that inexpensive mUAVs may be used by adversaries not only for intelligence, surveillance, and reconnaissance (ISR), but also as weapon delivery platforms that may carry explosive, chemical, radiological, and/or biological payloads. Attempting to destroy mUAVs carrying such payloads makes possible inadvertent abetting of an adversary's mission. That is, conventional attempts to destroy an mUAV may not neutralize the payload, but may actually assist in dispersing chemical or biological agents over an area.

Alternative systems and methods for non-destructive disabling and control of a threat or hostile weaponized mUAV are desired.

SUMMARY

In one embodiment, a UAV-borne countermeasure for non-destructively disabling and controlling a threat UAV includes a penetrator rod which is propelled toward the threat UAV to pierce the skin of the fuselage of the threat UAV. When the penetrator rod has entered the interior space of the fuselage, a disabling substance is dispensed from the end of the penetrator rod and injected into the interior of the threat UAV. The disabling substance acts to destroy or disable the electrical and/or mechanical systems of the threat UAV. The disabling substance may be released from a pressurized volume via a trigger. The trigger may be from an electronic or mechanical sensor installed on the predatory UAV or on the countermeasure for detecting proximity to the threat UAV. The trigger may be an electrical signal or may be a simple mechanical contact trigger actuated for example, upon a tap of the countermeasure on the threat UAV. The disabling substance may be an electrically conductive or corrosive fluid. In another embodiment, an expanding foam may be used that when injected into the fuselage or payload of the UAV, fills or encapsulates the payload of the threat UAV. In a scenario where the threat UAV is carrying a hazardous payload, the expanding foam may prevent dispersion of the hazardous material if the threat UAV crashes, for example, as a result of being disabled from the auto-injector countermeasure.

In an embodiment of the disclosure, a method for non-destructively disabling and controlling a threat UAV includes providing a predatory UAV on which an auto-injector device is mounted. A controllable mount is used to position the auto-injector device to a selectable position or orientation for linking with the threat UAV. The predatory UAV may be configured to operate in a patrolling mode until sensors onboard the predatory UAV sense and identify a threat UAV. Upon detection of the threat UAV, the predatory UAV transitions to a pursuit mode in which the predatory UAV pursues and engages the threat UAV. Upon closing on the threat UAV, the auto-injector device is positioned via the controllable mount to orient a penetrator of the auto-injector device in a direction of the threat UAV such that engagement is projected onto a target area of the threat UAV. Upon reaching the threat UAV and alignment with the target area, the auto-injector is deployed, propelling the penetrator through the skin of the fuselage of the threat UAV and injecting a disabling substance into the interior space of the fuselage of the threat UAV. The disabling substance acts to disrupt flight control and communications of the threat UAV with its ground control. The auto-injector may act as a coupler to attach the predatory UAV to the threat UAV in which the fixed wings of the predatory UAV and the threat UAV create a combined airfoil, allowing the predatory UAV to operate as a biplane and exert flight control over the threat UAV which may be flown to a safe and controlled area for retrieval.

In one embodiment of the disclosure, an injector device configured to mount to a predatory unmanned aerial vehicle (UAV) for non-destructively disabling and controlling a threat UAV comprises a rigid housing having a hollow interior. A controllable mount structure attaches the rigid housing to the predatory UAV and aligns the housing opening with the fuselage or payload of the threat UAV. A rigid penetrator rod disposed in the interior of the housing is configured to pierce the fuselage and hence payload of the threat UAV. A conduit coupled to the penetrator rod enables a disabling substance to be conveyed through the penetrator rod and into the payload of the threat UAV. An ejector propels the penetrator rod from the housing and into the payload of the threat UAV in response to a trigger when the threat UAV is within a predetermined range.

In one embodiment of the disclosure, the penetrator rod includes a body portion and a tipped end adapted to penetrate the skin of the payload of the threat UAV. A bore extends through the tipped end and the body portion for conveying the disabling substance to be output via the tipped end. In one embodiment of the disclosure, a plurality of barbs are disposed on the body and/or tipped end of the penetrator rod and configured to resist a backward force from withdrawing the penetrator rod when the rod has pierced the payload of the threat UAV. The penetrator rod may be configured as a grappling hook such that after penetration through the skin of the threat UAV, the penetrator rod acts to resist a force directed to withdrawal of the rod from the threat UAV. In one embodiment, the disabling substance is an electrically conductive fluid. In another embodiment, the disabling substance is a corrosive fluid. In still another embodiment, the disabling substance may be an expanding foam that fills or encapsulates the payload of the threat UAV.

The ejector may comprise a spring configured to exert a spring-loaded force on the penetrator rod. In another embodiment, the ejector may comprise a pressurized gas chamber operatively coupled to the penetrator rod. In still another embodiment, the ejector may comprise an explosive charge disposed in the housing for propelling the penetrator rod out of the housing toward the threat UAV.

The device may include an impact sensor disposed on the housing for sensing impact of the predatory UAV with the threat UAV. In one embodiment, the impact sensor comprises a touch sensitive trigger. Detection of impact by the impact sensor may trigger the ejector to propel the penetrator rod from the housing and into the payload of the threat UAV. A computer controller may be configured to position the controllable mount so as to adjust the relative angle between the housing and the predatory UAV so as to align the housing opening with the payload of the threat UAV. The device may further include a camera aligned with the housing and operative for providing image data to the computer controller for controllably positioning the mount structure and hence the housing. In one embodiment, the camera is aligned with a central axis of the housing.

In one embodiment of the disclosure, a method of non-destructively disabling and controlling a threat unmanned aerial vehicle (UAV) comprising the steps of: controlling a predatory UAV to intercept the threat UAV; controllably aligning a rigid housing extending from a body of the predatory UAV and containing a penetrator rod, with a target area of the threat UAV; firing the penetrator rod from the housing to pierce the surface of the threat UAV at the target area and lodge within the target area of the threat UAV, in response to a trigger signal; injecting a disabling substance to the interior of the target area of the threat UAV via the penetrator rod lodged therewithin for disabling flight control of the threat UAV; exerting flight control over the threat UAV, via the predatory UAV; and navigating the threat UAV to a given location for retrieval. In one aspect, the step of firing the penetrator rod includes operating an actuator, responsive to receiving the trigger signal, which performs an action which propels the penetrator rod in a direction of the target area of the threat UAV. In another aspect, operating the actuator comprises detonating an explosive charge.

BRIEF DESCRIPTION OF THE DRAWINGS

FIG. 3A is an illustration of a predatory UAV in pursuit of a detected threat UAV.

FIG. 3B is an illustration of the predatory UAV of FIG. 3A closing on the threat UAV shown in FIG. 3A.

FIG. 3C is an elevational view of a predatory UAV coupled to a captured threat UAV via an auto-injector device according to an embodiment of the disclosure.

DETAILED DESCRIPTION

Figure 1:
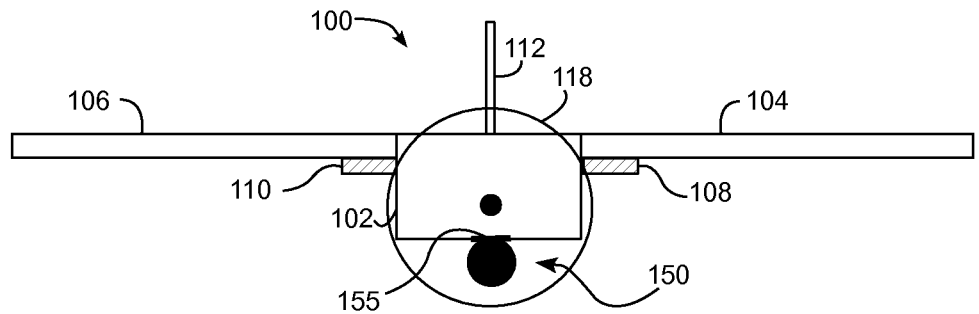
FIG. 1 is an elevation view of an unmanned aerial vehicle equipped with an auto-injector device for disabling a threat UAV.
Figure 2:
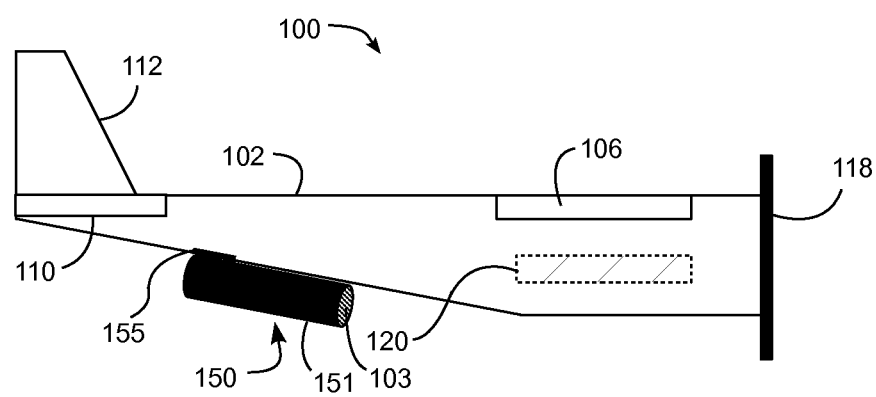
FIG. 2 is a side elevational view of the UAV of FIG. 1.

Referring collectively to FIGS. 1 and 2, there is shown an exemplary embodiment of an unmanned aerial vehicle (UAV) 100 configured to include an injector device 150 for non-destructively disabling and controlling another UAV (e.g. mUAV) identified as a threat UAV. In an exemplary embodiment, injector device 150 may be attached to UAV 100 through an adjustable or controllable mount structure 155. In the exemplary embodiment, UAV 100 comprises a fixed wing UAV. The UAV 100 may be configured to fly autonomously or be piloted remotely. In other embodiments, the UAV may comprise a rotary wing UAV. The UAV 100 includes fuselage 102, left and right main wings 104, 106, left and right horizontal stabilizers 108, 110, and vertical stabilizer 112. The UAV 100 may be propelled via a front or rear mounted internal combustion engine or electric powered motor (not shown). The engine or motor is configured to operate a propeller 118 (FIG. 2). The propeller 118 can be disposed at the front of the fuselage 102 as shown, or disposed at the rear of the fuselage. Alternatively, the UAV 100 can be propelled by a jet propulsion system.

The fuselage 102 of the UAV is configured to carry any number of desired payloads, including but not limited to, different types of navigational systems, such as Global Positioning System or GPS. The UAV 100 may employ an integral host-side flight and payload control system 120 that includes ground station and onboard systems such as communications systems, flight control computers and actuators. The host-side flight and payload control system 120 allows the flight modes, flight path, and mission tasking to be modified, if desired, in-flight. The injector device 150 includes a rigid housing 151 attached to the controllable mount 155.

As will be described in greater detail, the rigid housing of the auto-injector device 150 has an open end 103 that may be utilized propel a penetrator rod from the housing to attach the predatory UAV (e.g. 301 of FIG. 3A-3C) to an identified threat UAV (e.g. 307 of FIG. 3A-3C). The attachment or coupling produces a combined airfoil, like a biplane, comprising the fixed wing of the predatory UAV and the fixed wing of the threat UAV. The predatory UAV may contact engage the threat UAV at a targeted position (e.g. the fuselage or payload of the threat UAV) and inject a disabling substance (e.g. 419 of FIG. 4) into the interior of the fuselage to disable the threat UAV's flight control and/or hazardous payload of the threat UAV, and gain operational control of the UAV 303.

Figure 4:
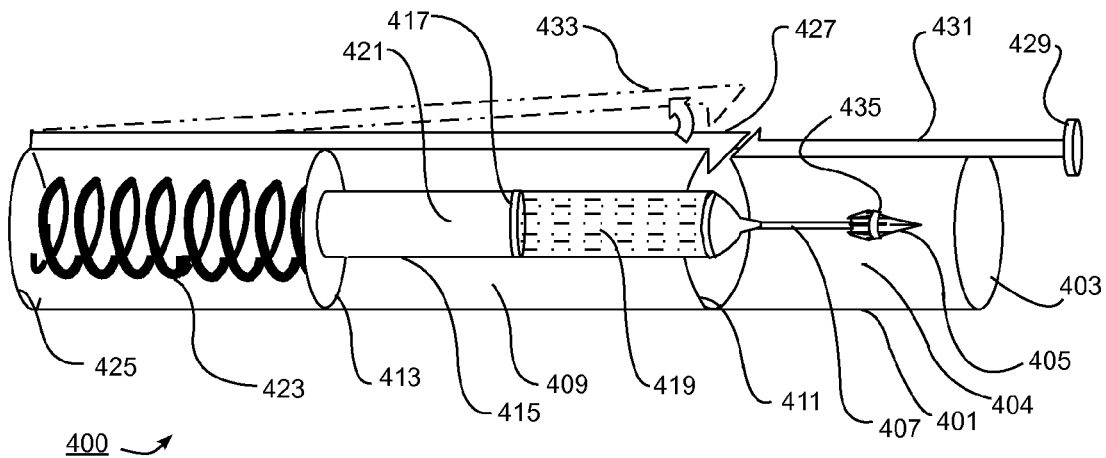
FIG. 4 is a perspective view of an exemplary embodiment of an auto-injector device for mounting on a UAV.

Referring now to FIG. 4 in conjunction with FIGS. 1-3, there is shown an exemplary embodiment of the injector device depicted generally in FIGS. 1-3. An injector device is configured to mount to a predatory unmanned aerial vehicle (UAV) for non-destructively disabling and controlling a threat UAV. The device comprises a rigid housing having a proximal end, a distal end, and a hollow interior, the distal end defining an opening for engagement with a threat UAV. A controllable mount attaches the rigid housing to the predatory UAV and is configured to adjust a relative angle between the rigid housing and the predatory UAV to align the housing opening with the payload of the threat UAV. A rigid penetrator rod is disposed in the interior of the housing, and configured to pierce the payload of the threat UAV. A conduit is coupled to the penetrator rod and configured to enable a disabling substance to be conveyed through the penetrator rod and into the payload of the threat UAV. An ejector is configured to propel the penetrator rod through the payload of the threat UAV in response to a trigger when the threat UAV is within a predetermined range.

The injector device of FIG. 4 is labeled generally as 400 and is configured for non-destructive disablement and control of a threat UAV (e.g. 303 FIGS. 3A-3C). In the exemplary embodiment, injector device 400 provides a lightweight, compact auto-injector mechanism contained within rigid cylindrical housing 401. The body of housing 401 includes a first open end 403 and a second end 425. The housing is configured to be of a strong, durable, lightweight material such as a metal or composite. The first end 403 defines a cylindrical section which houses a penetrator rod 405 connected to a hollow shaft 407. The penetrator rod is likewise formed of a strong and durable material, such as a metal (e.g. steel) or composite structure. Adjacent to the first section, a payload section 409 having a forward edge 411 and an aft edge 413 contains a syringe 415 comprising a cylindrical tube having a plunger 417 which provides separation between a disabling substance 419 and a pressurized volume 421. The aft edge 413 of the payload section 409 is attached to one end of spring 423 which is compressed between the aft edge 413 and the second end 425 of housing 401. In an armed or undeployed state, spring 423 is compressed and exerts a force against the aft end 413 of payload section 409. Prior to deployment, payload section 409 is held in place against the force of spring 423 by means of a latch 427 disposed along a longitudinal edge of housing 401. In an exemplary embodiment, a tooth on the end of latch 427 engages the forward edge 411 of the payload section 409 to retain the payload section against the force of spring 423. A touch sensitive trigger 429 is coupled to an actuator rod 431 aligned with latch 427 along the same longitudinal edge of housing 401 upon which latch 427 is positioned. When touch sensitive trigger 429 comes into physical contact with another object, for example, a threat UAV, actuator rod 431, is urged back along the edge of housing 401 toward latch 427. A complementary tooth on actuator rod 431 contacts and urges latch 427 radially outward from the longitudinal axis at the center of cylindrical housing 401 as shown by the broken line 433. When the tooth of latch 427 clears the forward edge 411 of payload section 409, payload section 409 and the penetrator rod 405 is projected forward through the housing 401 toward the first open end 403 by the spring force exerted by spring 423 against the second end 425 of housing 401.

Figure 4A:
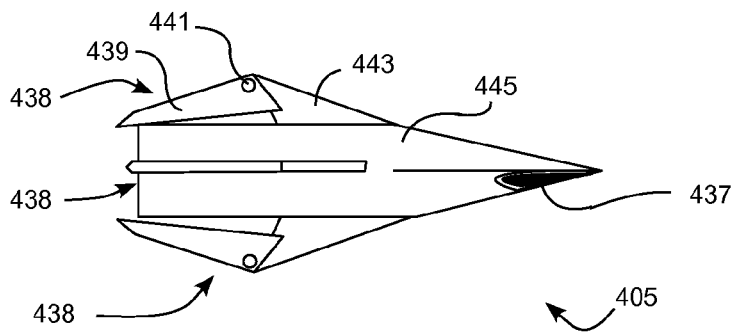
FIGS. 4A and 4B are elevational views of a penetrator for use with the auto-injector device of FIG. 4 in an undeployed and deployed state, respectively.

FIG. 4A is a side elevation view of the tipped end of penetrator rod 405 in the undeployed state. The penetrator rod 405 includes a number of segmented barbs 438 that act as hooks when deployed into the skin of a threat UAV, or as vanes when the auto-injector is in flight after being deployed. Each barb/vane 438 has an end segment 439 rotatably mounted on a body segment 443 about axis 441. Body segment 443 is rotatably mounted to partially hollow body 445. Body 445 has sufficient mass to pierce the skin of a threat UAV, but is configured with a hollow channel that passes longitudinally through body 445. The channel extends from a rear end of the penetrator 405 rod at a point where the penetrator rod is attached to hollow shaft 407 (FIG. 4). The disabling substance 419 may be delivered through penetrator rod 405 by way of non-limiting example, via beveled orifice 437.

Figure 4B:
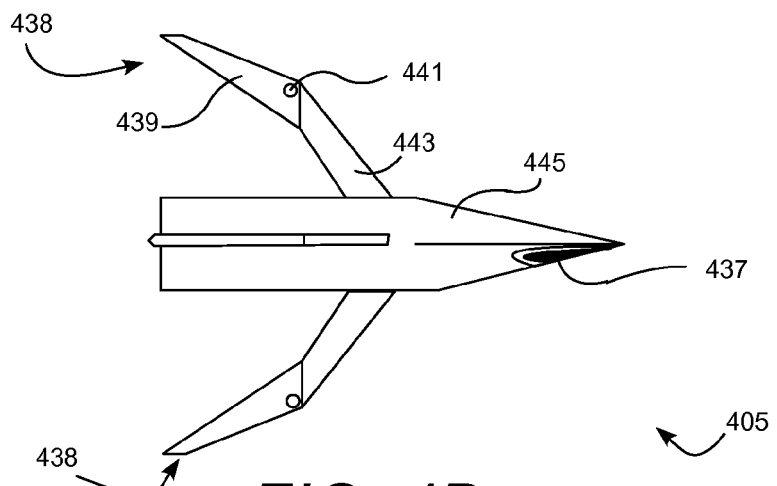

Referring to FIG. 4B, penetrator rod 405 is shown in a deployed state. In a deployed state, each barb/vane 438 is extended outward from the partially hollow body 445. Body segment 443 is rotationally coupled to body 445. When deployed, body segment 445 extends outward in relation to the longitudinal axis 444 of penetrator rod 405. End segment 439 of barb 438 is rotationally coupled to end segment 443 at axis 441 and extends to a maximum angle defined by end segment 439 and body segment 443, having a vertex at axis 441. When barb/vane 438 is extended to the maximum angle and penetrator rod 405 has penetrated, for example, the skin of a threat UAV, a force applied in a direction opposite the direction of flight of the penetrator 405 will cause barb/vane 438 to act as a grappling hook, engaging the penetrator 405 within the target UAV whose skin has been penetrated to thereby maintain the penetrator within the interior of the target or threat UAV.

Body segment 443 and end segment 439 may be rotationally coupled using a spring which exerts an outward force, urging the body segment 443 and end segment 439 outward from body 445 to a maximum angle in relation to longitudinal axis 444. During flight, barb/vane 438 may is retained in an undeployed state until penetrator 405 physically contacts a target. For example, a resilient band 435 (shown in FIG. 4) may be placed around vanes/barbs 438 to retain them in an undeployed position. Upon striking and penetrating the skin of a target, the resilient band 435 may be configured to break due the friction force of the penetrator 405 passing through the skin of the target. When the penetrator 405 has penetrated the skin of the target and the resilient band 435 is removed, vanes/barbs 438 are extended outward (e.g fan out) to prevent withdrawal of the penetrator 405 by a force in a reverse direction. Upon application of a force in a reverse direction, extended barbs/vanes 438 will engage the inner surface of the skin of the target and prevent removal of the penetrator 405. Other release mechanisms and/or impact trigger mechanisms for deployment of the vanes/barbs on penetrator rod 405 are also contemplated.

Upon penetration of the skin of the UAV (e.g. the fuselage and payload of the threat UAV) by the penetrator 405 and engagement via barbs/vanes 438, the auto-injector 400 injects the disabling substance 419 to the payload interior via shaft 407, through partially hollow body 445 and out of penetrator 405 through beveled orifice 437. The disabling substance may be an electrically conductive or corrosive fluid. In another embodiment, an expanding foam may be used that when injected into the fuselage or payload of the UAV, fills or encapsulates the payload of the threat UAV. In a scenario where the threat UAV is carrying a hazardous payload, the expanding foam may serve to encase the payload, thereby preventing dispersal of hazardous agents if the threat UAV crashes (e.g. as a result of being disabled from the auto-injector countermeasure).

Figure 5:
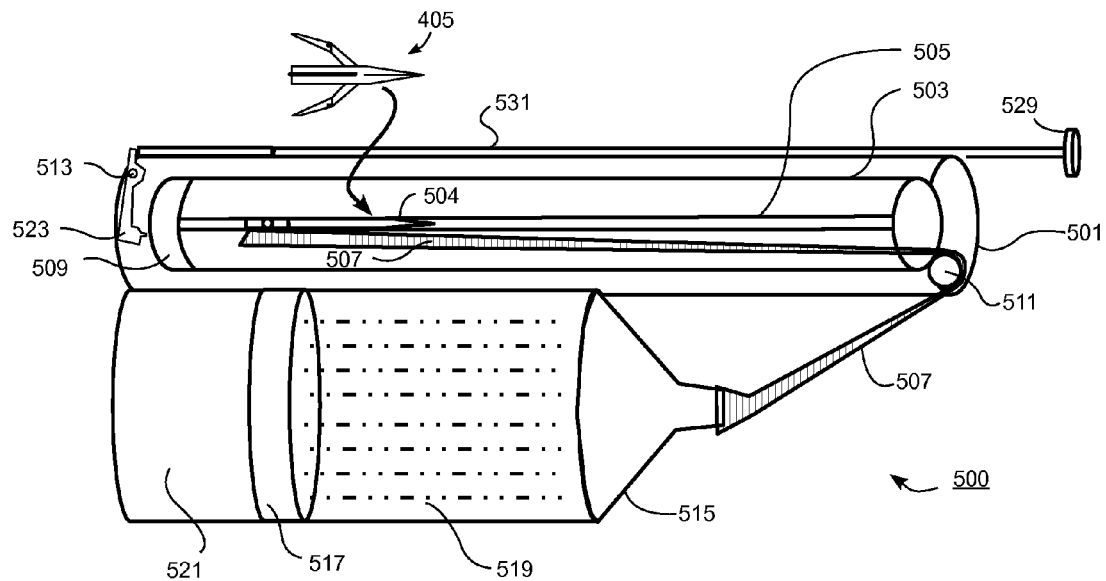
FIG. 5 is a perspective view of another embodiment of an auto-injector device for use with the UAV of FIG. 1.

Referring now to FIG. 5, in conjunction with FIGS. 1, 2 and 3A-C, there is illustrated another exemplary embodiment of an auto-injector device 500 which deploys penetrator rod 505 at high velocity from its housing to pierce the skin of an airborne target. This may occur, for example, where the target is not being held stationary. Auto-injector 500 includes a rigid cylinder 501 defining an outer tube, and an inner firing tube or barrel 503 which houses penetrator rod 505 prior to deployment. The outer and inner tubes have openings at their distal ends for deployment of the penetrator rod. Penetrator rod 505 is attached to a flexible tubing 507 which attaches penetrator rod 505 to syringe 515 containing the disabling substance 519. As discussed above with regard to the embodiment of FIG. 4, the disabling substance 519 may be any substance that when injected into the target UAV operates to non-destructively disable the target, by interfering with the aerodynamics of the target, and/or by damaging or disabling internal components such as flight and control circuitry, motors or engines, or mechanical controls such as rods which control flaps, ailerons, and/or rudders. By way of non-limiting example, disabling substance 519 may be expanding foam, an electrically conductive fluid, or a corrosive fluid.

Syringe 515 is coupled to the penetrator rod 505 by tubing 507. In the exemplary embodiment, tubing 507 is wrapped around a boss 511 mounted on the outside of cylinder 501 and extends between the inner wall of cylinder 501 and the outer wall of firing tube 503 and terminating at penetrator rod 505. As seen in FIG. 5, the penetrator rod is loaded into or deployed within firing tube 503. Firing tube 503 includes a slot 506 defined along its longitudinal extent which allows the connection point between tubing 507 and penetrator rod 505 to travel along the firing tube 503 when penetrator 505 is fired, without disconnecting tubing 507 from the penetrator 505. When auto-injector 500 is in a cocked and "ready to fire" state, tubing 507 is stretched across boss 511 in a manner so as to pinch tubing 507 with sufficient force to prevent the flow of disabling substance 519 through tubing 507. Syringe 515 contains the disabling substance 519 and a piston 517 separates the disabling substance 519 from pressurized volume 521. When the penetrator rod 505 is fired from firing tube 503, penetrator rod 505 is projected forward along slot 506. The terminal end of tubing 507 attached to the partially hollow body 445 (FIGS. 4A, 4B) of penetrator rod 505 likewise travels in the direction of the penetrator rod toward the distal end opening. When the penetrator rod 505 exits the distal or forward end of cylinder 501, the pressure exerted by boss 511 on tubing 507 is relieved. Pressurized volume 521 exerts a force on piston 517 which compresses disabling substance 519, causing the disabling substance 519 to begin flowing through tubing 507. The disabling substance flows through tubing 507, into the partially hollow body of penetrator 505 and into the target.

Penetrator 505 may be fired from firing tube 503 by an explosive charge 509 positioned in firing tube 503 rearward of penetrator 505. Charge 509 may be ignited by a firing pin 523 which is pivotally mounted on cylinder 501 at pivot point 513. A contact trigger 529 coupled to an actuator rod 531 moves parallel to the longitudinal surface of cylinder 501 and causes firing pin 523 to pivot about pivot point 513 in response to contact engagement of trigger 529 with a surface, such as the surface of the threat UAV (e.g. 303 of FIG. 3C). When activated by the contact trigger 529, the firing pin 523 strikes charge 509 which explodes and provides a projectile force to penetrator 505, forcing penetrator 505 and attached tubing 507 from firing tube 503 toward the threat UAV target.

FIGS. 3A, 3B and 3C illustrate schematically a pursuit and non-destructive capture of a threat UAV 303 by means of an auto-injector device 150 mounted onto a predatory UAV. Referring to FIG. 3A, a pursuit is shown in which predatory UAV 301 configured to include an auto-injector device 150 of the type described herein, is in pursuit of a detected threat UAV 303. The auto-injector device 150 includes within rigid housing 151 a penetrator rod (e.g. 405 of FIG. 4) configured to be propelled toward the threat UAV 303 and adapted to pierce the skin of the fuselage of threat UAV 303. Predatory UAV 301 may be configured with a flight controller 120 (FIG. 2) which provides flight control signals from one or more sensors to a computer processor which processes the flight control signals and provides electro-mechanical signals to actuators providing mechanical flight control to predatory UAV 301. For example, the processor (not shown) may receive signals from a sensor which detects the presence of a threat UAV 303. The sensor may be a global positioning system (GPS) or may be an acoustic receiver that processes acoustic signatures. Furthermore, other sensors may be used that receive input from the environment which may be analyzed to detect the presence of a threat UAV 303. When the presence of the threat UAV 303 is detected, the controller may produce an electrical and/or electro-mechanical signal to cause predatory UAV 301 to enter a pursuit mode where predatory UAV 301 tracks and follows threat UAV 303. Various sensors may be located on predatory UAV 301 which detect the presence of threat UAV 303 as well as other variables, such as heading, speed and altitude. The controller may produce electro-mechanical signals which cause the motor of predatory UAV 301 to increase power to allow predatory UAV 301 to close in on threat UAV 303 in order to deploy the auto-injector device 150 from a close range.

Referring now to FIG. 3B, a side elevation view is shown of predatory UAV 301 and threat UAV 303, as predatory UAV 301 equipped with auto-injector device 150, closes in on threat UAV 303. During pursuit, predatory UAV 301 is controlled through electro-mechanical signals generated by the computer controller and processor of predatory UAV 301, identified in FIG. 3B as 305, to increase speed to close the distance between predatory AUV 301 and the detected threat UAV 303. As predatory UAV 301 comes into proximity to threat UAV 303, the controller transmits control signals to position auto-injector device 150 by means of controllable mount 155, at an approach angle based on the detected position of threat UAV 303. The position of threat UAV 303 relative to predatory UAV 301 may be determined, by way of non-limiting example, by a camera co-aligned with the housing body 151 of auto-injector device 150. That is, computer controller 305 may be configured to controllably position the controllable mount 155 so as to adjust the relative angle alpha (a) between the rigid housing 151 and the surface 310 of the predatory UAV so as to align the housing opening (403 of FIG. 4) with a target area 312 fuselage or payload area of the threat UAV 303. It is understood that the position of the auto-injector may be controlled in multiple degrees of freedom so as to properly target and engage the threat UAV 303. The controllable mount structure may be embodied as a support structure with one or more arm members and having axial joints and/or actuators with multiple degrees of freedom for controllably positioning the housing 151 such that the housing opening will align with and engage a target area of the threat UAV. The device may further include a sensor (e.g. electromagnetic, acoustic, optical) such as a camera aligned with the housing and operative for providing sensor data to the computer controller 305 for controllably positioning the mount structure and housing for alignment and engagement with the threat UAV. In one embodiment, the camera is aligned with a central axis of the housing 151.

Figure 6A:
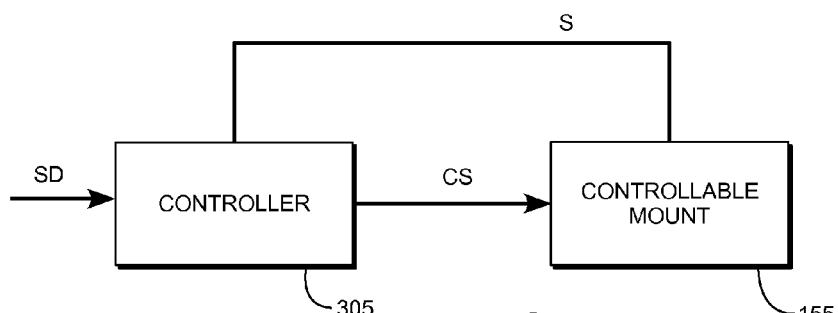
FIG. 6A is a block diagram showing positional control of the injector device mounted to a UAV prior to engagement according to an embodiment of the disclosure.

FIG. 6A illustrates an exemplary block diagram wherein computer controller 305 provides control signals CS to controllably position controllable mount 155 to thereby adjust the relative position of rigid housing 151 (e.g. angle between housing 151 and the predatory UAV) in order to align the housing opening with the payload of the threat UAV. Sensor data SD received from one or more sensors associated with the predatory UAV (e.g. range to target, velocity, acceleration, angle of approach, altitude of UAVs) in combination with feedback position information S is processed by computer controller 305 to orient the housing 151 relative to a target area of the threat UAV for penetration by the penetrator rod upon trigger.

A simple touch sensitive trigger 309 may be used which releases the penetrator rod of auto-injector device 150 upon impact with sufficient force to pierce the fuselage of threat UAV 303. The penetrator may be equipped with one or more barbs, which prevent the backing out of the penetrator once it has penetrated the skin of the threat UAV 303.

FIG. 3C shows predatory UAV 301 and threat UAV 303 after the two UAVs have been coupled together via auto-injector device 150 according to an exemplary embodiment. In an embodiment where a grapple-tipped penetrator is used, barbs on the penetrator prevent the device from being extracted from the threat UAV 303. In the exemplary embodiment, the UAVs are coupled through the cylindrical body 151 of auto-injector device 150. If the intercept profile between predatory UAV 301 and threat UAV 303 is defined as being from above and behind, as shown, upon capture of the threat UAV 303, the pair of UAVs create a combined airfoil comprising the fixed wing 305 of predatory UAV 301 and the fixed wing 307 of threat UAV 303. The implication of achieving this biplane configuration results in increased lift characteristics for a given wing area, thus providing the predatory UAV 301 with the ability to control the flight of a threat UAV 303 that is substantially larger than itself.

According to another aspect of the present disclosure, the injection of disabling substance into the interior of the threat UAV may be controlled such that, depending on the particular application, the size of the threat UAV, or the relative size of the target payload or fuselage, by way of non-limiting example, the amount and/or rate injected into the interior may be adjusted. Further, the force needed to expel the penetrator rod from the housing and to penetrate the skin of the threat UAV while maintaining the tip end of the penetrator rod within the interior of the UAV may be controlled according to the particular application.

Figure 6B:
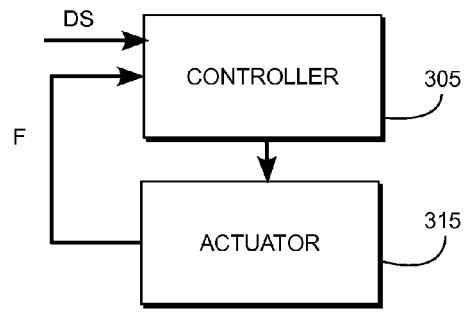
FIG. 6B is a block diagram showing rate control of the injector device mounted to a UAV upon engagement according to an embodiment of the disclosure.

Referring to the block diagram of FIG. 6B, such adjustments may be made based on sensor data DS received by the predatory UAV computer controller 305, which may send one or more control signals SC to one or more actuators 313 associated with the injector device 150 for controlling one or more of the amount of charge for detonation, pressurized volume, substance flow rate, and the like. The actuators and computer controller 305 may be configured in a feedback loop to with feedback data F from the actuators provided to controller 305.

While exemplary drawings and specific embodiments have been described and illustrated herein, it is to be understood that that the scope of the present disclosure is not to be limited to the particular embodiments disclosed herein. By way of non-limiting example, the injector device can be mounted to the wing or wings of the UAV depending upon the structure of the UAV. Thus, the embodiments shall be regarded as illustrative rather than restrictive, and it should be understood that variations may be made in those embodiments by persons skilled in the art without departing from the scope of the present invention as set forth in the claims that follow and their structural and functional equivalents.

What is claimed is:

1. An injector device configured to mount to a predatory unmanned aerial vehicle (UAV) for non-destructively disabling and controlling a threat UAV, comprising:
   a rigid housing having a proximal end, a distal end, and a hollow interior, the distal end defining an opening for engagement with a threat UAV;
   a controllable mount for attaching the rigid housing to the predatory UAV and configured to align the opening with the payload of the threat UAV by controlling an orientation of the rigid housing relative to the predatory UAV;
   a rigid penetrator rod disposed in the interior of the rigid housing, and configured to pierce a payload of the threat UAV;
   a conduit coupled to said rigid penetrator rod and configured to enable a disabling substance to be conveyed through said penetrator rod and into the payload of the threat UAV; and
   an ejector configured to propel said rigid penetrator rod through the payload of the threat UAV in response to a trigger when the threat UAV is within a predetermined range.

2. The device of claim 1, wherein the penetrator rod comprises a body portion and a tipped end adapted to penetrate the skin of the payload of the threat UAV, and further comprising a bore extending through the tipped end and the body portion for conveying the disabling substance to be output via said tipped end.

3. The device of claim 2, further comprising a plurality of barbs disposed on the body portion of said penetrator rod and configured to resist a backward force from withdrawing said penetrator rod when said penetrator rod has pierced the payload of the threat UAV.

4. The device of claim 3, wherein said tipped end comprises a grappling hook.

5. The device of claim 1, wherein said disabling substance is an electrically conductive fluid.

6. The device of claim 1, wherein said disabling substance is a corrosive fluid.

7. The device of claim 1, wherein said disabling substance is an expanding foam.

8. The device of claim 1, wherein said ejector comprises a spring configured to exert a spring-loaded force on said penetrator rod.

9. The device of claim 1, wherein said ejector comprises a pressurized gas chamber operatively coupled to said penetrator rod.

10. The device of claim 1, wherein said ejector comprises an explosive charge disposed in said rigid housing for propelling said penetrator rod.

11. The device of claim 1, further comprising an impact sensor disposed on the rigid housing for sensing impact of the predatory UAV with the threat UAV and generating said trigger.

12. The device of claim 1, further comprising a computer controller configured to controllably position the controllable mount to adjust a relative angle between the rigid housing and the predatory UAV to align the opening with the payload of the threat UAV.

13. The device of claim 12, further comprising a camera aligned with said rigid housing and operative for providing image data to said computer controller for controllably positioning said controllable mount.

14. The device of claim 13, wherein said camera is aligned with a central axis of said rigid housing.

15. The device of claim 11, wherein said impact sensor comprises a touch sensitive trigger.

16. A method of non-destructively disabling and controlling a threat unmanned aerial vehicle (UAV) comprising the steps of:
   controlling a predatory UAV to intercept the threat UAV;
   controllably aligning a rigid housing extending from a body of the predatory UAV and containing a penetrator rod, with a target area of the threat UAV;
   firing said penetrator rod from said rigid housing to pierce the surface of the threat UAV at the target area and lodge within the target area of the threat UAV, in response to a trigger signal;
   injecting a disabling substance to the interior of the target area of the threat UAV via said penetrator rod lodged there within, wherein the disabling substance disables flight control of the threat UAV;
   exerting flight control over the threat UAV, via said predatory AUV; and
   navigating said threat UAV to a given location for retrieval.

17. The method of claim 16, wherein the step of firing said penetrator rod includes operating an actuator, responsive to receiving said trigger signal, which performs an action which propels said penetrator rod in a direction of the target area of the threat UAV.

18. The method of claim 17, wherein operating said actuator comprises detonating an explosive charge.

19. The method of claim 17, wherein operating said actuator comprises releasing a spring which is biased to exert a spring-loaded force on said penetrator rod, wherein upon release of said spring, said penetrator rod is propelled in the direction of the target area of the threat UAV.

20. The method of claim 17, wherein operating said actuator comprises opening a valve of a pressurized chamber to release a gas under pressure, wherein expansion of said gas under pressure propels said penetrator rod in the direction of the target area of the threat UAV.

21. An auto-injector device for use with a predatory unmanned aerial vehicle (UAV) to non destructively disable and control a threat UAV, comprising:

a penetrator rod having a hollow core and an orifice proximal to a point of said penetrator rod, configured to pierce a fuselage of the threat UAV;

a cylindrical body having an open end, configured to hold said penetrator rod;

a pressurized volume of a disabling fluid, coupled to said hollow core of said penetrator rod and configured for conveyance through the penetrator rod to the orifice for delivery to the fuselage of the threat UAV;

a propulsion mechanism for propelling said penetrator rod out from said cylindrical body via said open end upon receiving a deployment signal; and a controllable mount for attaching said auto-injector device to the predatory UAV configured to control an angle of approach of said auto-injector device relative to the predatory UAV as the predatory UAV closes on the threat UAV.

22. The device of claim 21, wherein upon penetration of the penetrator rod of the predatory UAV into the fuselage of the threat UAV, said cylindrical body rigidly positions said predatory UAV relative to said threat UAV to produce a combined airfoil configuration comprising a fixed wing of the predatory UAV and a fixed wing of the threat UAV.

* * * * *